United States Patent Office 2,886,361
Patented May 12, 1959

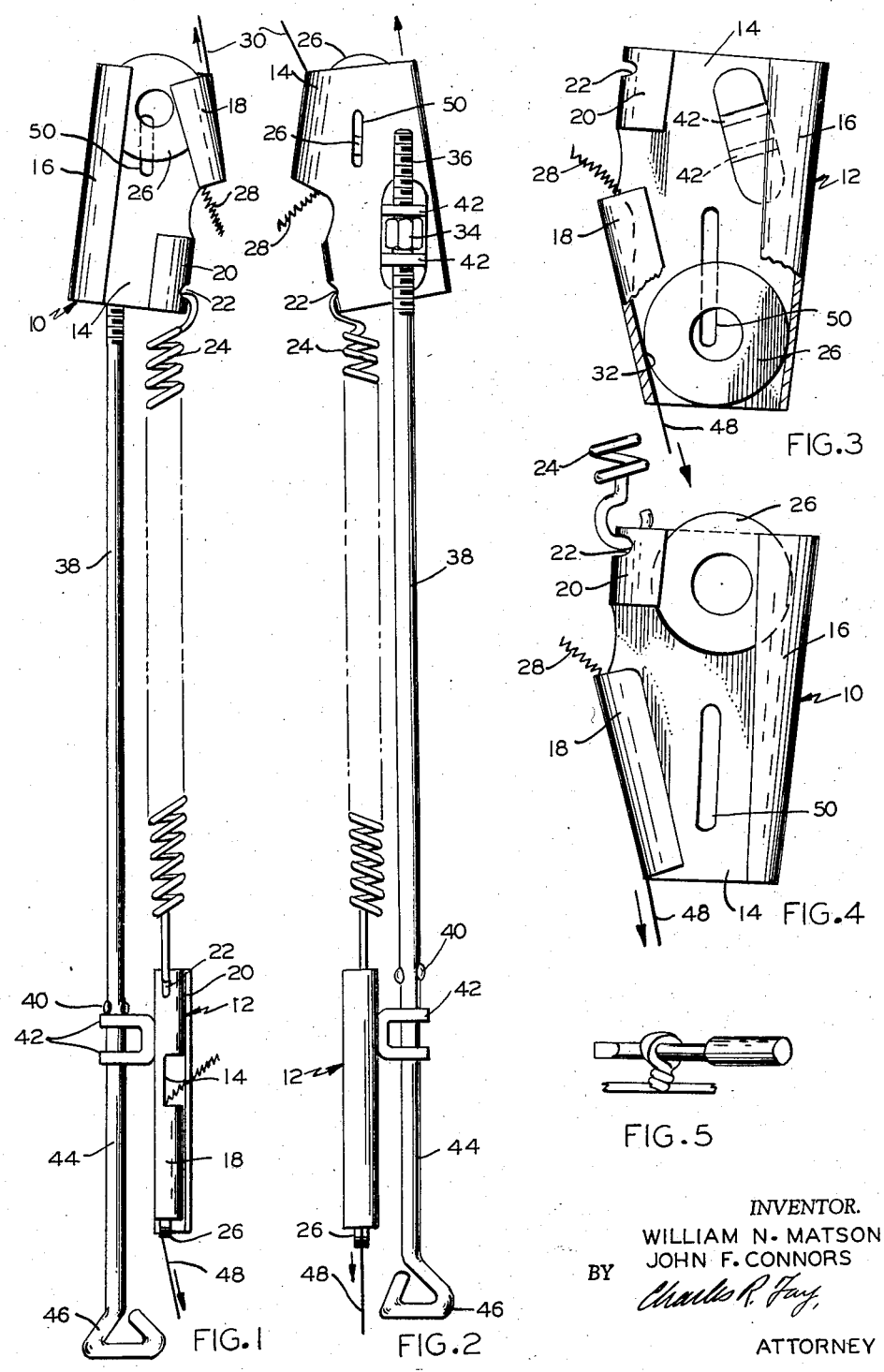

2,886,361

GUY WIRE CONNECTOR

William N. Matson and John F. Connors, Fitchburg, Mass.; said Connors assignor to said Matson Application September 26, 1957, Serial No. 686,438

6 Claims. (Cl. 287—83)

This invention relates to a connector device for guy wires and other wires, cables, chains, etc. where a certain resilient tension is desired as for instance in the erection and maintenance of antennas, stacks, and poles of any nature.

The principal object of the present invention resides in the provision of a pair of like connector plates for locking the ends of the wire or cable to be connected together, with resilient means between the locking plates whereby the ends of the wire or cable may be applied to the plates with the resilient means extended to form a connection under resilient tension; in combination with an axially adjustable rigid rod which is provided with means for applying a predetermined tension to the spring, thus preloading it to the desired degree prior to application thereof to the wire or cable; and the provision of a connector as above described wherein the rigid rod is slidably mounted with relation to one connector locking plate and adjustably mounted with relation to the other connector locking plate in order to allow for further extension of the spring under conditions for instance of high winds, whereby the wire or cable is maintained under resilient tension at all times regardless of the weather or climatic conditions encountered, said rod providing means limiting the extent of motion of the respective locking plates to and from each other to preserve the resilience and use of the device.

Other objects and advantages of the invention will appear hereinafter.

Reference is to be had to the accompanying drawings, in which:

Fig. 1 is an elevational view illustrating the complete connector applied to the ends of a wire or cable;

Fig. 2 is a similar view showing the reverse of Fig. 1;

Fig. 3 is a view, partly in section, illustrating the action of a locking plate and showing the same locked;

Fig. 4 is a similar view showing the plate unlocked for application of the cable thereto; and Fig. 5 is a view illustrating twisting the wire prior to installation.

In carrying out the present invention, there is provided a pair of end connecting or locking plates which are generally indicated at 10 and 12. These plates are alike and each comprises a flat plane body portion 14 having at one edge thereof a rolled-over flange 16 which is spaced from the flat body portion 14. At the opposite edge thereof, there is another rolled-over flange 18 which is located at an angle with respect to flange 16 and may be shorter; and if desired a rolled-over flange 20 is provided, the same having an aperture as at 22 therein to receive one end of a tension spring 24.

Contained and held between the flanges 16 and 18, there is a locking piece 26 which may if desired be in the form of a washer or other ring-like or circular member. This locking member 26 is slidable as is shown in Figs. 4 and 5 from an unlocked condition in Fig. 4 to a locked condition in Fig. 3. It will be clear that the end 28 of a wire or cable 30 may be placed within flange 18 for instance, with the locking member in the Fig. 4 position, whereupon the locking member is moved in the direction of the arrow in Fig. 4 and wedges a wire or cable end tightly in the flange 18, locking the same in position as clearly shown at 32 in Fig. 3.

Both locking plates operate to lock the wire exactly the same, and like reference numerals have been applied to like members of both locking plates which are bodily reversed and extend away from each other as will be seen by comparison of Fig. 1 and Fig. 3.

However, the plate indicated at 10 is provided with a fixed nut 34 in which is threaded a threaded end 36 of an elongated rod 38. Rod 38 is provided with an enlargement or abutment 40 and rod 38 passes freely slidably through spaced upturned ears 42 forming an abutment fixed with respect to the locking plate 12 at its rear face. The portion of the rod 38 which is slidably arranged with respect to ears 42 is indicated at 44 and this portion of the rod 38 terminates in an enlarged handle 46. The nut 34 may conveniently be held by and between the spaced ears 42 on member 10.

In the use of the device, the wire is first twisted up by means of a screw-driver or special tool. The handle 46 is rotated in a direction to cause separation of the locking plates 10 and 12 by reason of the abutment 40 which bears on the member 42, see Fig. 1. This action stretches the spring and pre-tensions it to the degree desired, whereupon the twisted cable or wire may be applied to the locking plate as described above. In this connection, one wire or cable is indicated at 48 in order to distinguish it from the other wire or cable 30 to which it is to be connected.

When the wire or cable has been thus secured, the rod 38 is rotated in the opposite direction to cause the abutment 40 to be removed from the member 42 as shown in Fig. 2, and this action leaves the wire or cable under tension by reason of the resilient spring 24. Therefore there is thereafter a continuous resilient connection between the ends of the wires or cables as is desired in installations of this nature in order to compensate for winds, variations in temperature, etc. to maintain the antenna, pole, stack, etc. as desired in upright condition.

Under extreme conditions, the spring may be stretched to its limit and become permanently deformed and thus thereafter inoperative. In order to avoid this, the handle 46 provides an abutment which limits plate 12 from extending any further away from plate 10 than as limited by the position of handle 46; and of course the abutment 40 limits the motion of the spring in the opposite direction, while still maintaining the resilience of the entire device. Also, a pry-slot as at 50 may be utilized to admit a pin or other tool to free the member 26 to release the wire, if desired.

It is to be particularly noted that clamping members 10 and 12 are identical, but ears 42 are used for different purposes, depending on which member is to hold nut 34.

As to the wire clamps, the pressure of the member 26 due to the inclination of flange 18 is greater than the coefficient of friction, and the pressure is at right angles to the wire. Hence the grip on the wire is assured and cannot be accidentally removed, nor is the wire bent by member 26. The pry-slot 50 can be used both to loosen or tighten member 26 on the wire.

Having thus described our invention and the advantages thereof, we do not wish to be limited to the details herein disclosed, otherwise than as set forth in the claims, but what we claim is:

1. A connector comprising a pair of separately actuatable wire clamps, a spring connecting the same to tension wires connected in the clamps in directions away from the connector, a rod adjustably connected to one clamp in selective relatively fixed position thereto, a boss on the other clamp, said rod being slidable therein, and a stop on the rod between the clamps to limit the extent of one clamp toward the other.

2. A connecor comprising a pair of wire clamps, a spring connecting the same to tension wires connected in the clamps, a rod adjustably connected to one clamp in selective relatively fixed position thereto, a boss on the other clamp, said rod being slidable therein, and a stop on the rod between the clamps to limit the extent of one clamp toward the other, said stop forming an abutment to engage the boss to cause separation of the clamps when the rod is adjusted longitudinally in a direction to move away from the said one clamp.

3. A connector comprising a pair of wire clamps, a spring connecting the same to tension wires connected in the clamps, a rod adjustably connected to one clamp in selective relatively fixed position thereto, a boss on the other clamp, said rod being slidable therein, and a stop on the rod between the clamps to limit the extent of one clamp toward the other, said stop forming an abutment to engage the boss to cause separation of the clamps when the rod is adjusted longitudinally in a direction to move away from the said one clamp, and a handle on the rod acting as a stop for the boss in the opposite direction of relative motion of the clamps.

4. A device of the class described comprising a pair of similar members for connecting separately to a pair of elements, resilient means connecting the members and placing the connected elements under tension, and an elongated, axially adjustable rigid rod-like element connecting the members, each member comprising a plate, a pair of edge flanges facing each other but relatively inclined, and a movable clamping member between the flanges, said clamping members securely wedging the elements in a respective flange by movement to a position in the flange at the conveying portion thereof, and the angle of inclination of the flanges being such as to provide against accidental dislodgment of the clamping members.

5. The device of claim 4 including a pry-slot in each plate in the region of the clamping member to admit a tool to tighten or loosen the clamping member.

6. The device of claim 4 wherein said movable clamping member is substantially circular.

References Cited in the file of this patent

UNITED STATES PATENTS

| | | |
|---|---|---|
| 2,401,418 | Everley | June 4, 1946 |
| 2,407,958 | Kearney | Sept. 17, 1946 |
| 2,834,623 | Doering et al. | May 13, 1958 |